(12) United States Patent
Ono

(10) Patent No.: US 8,253,837 B2
(45) Date of Patent: Aug. 28, 2012

(54) IMAGE CAPTURING APPARATUS, METHOD OF CONTROLLING SAME AND PROGRAM THEREFOR

(75) Inventor: Satoshi Ono, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 12/033,335

(22) Filed: Feb. 19, 2008

(65) Prior Publication Data

US 2008/0198239 A1 Aug. 21, 2008

(30) Foreign Application Priority Data

Feb. 20, 2007 (JP) .................. 2007-039827

(51) Int. Cl.
*H04N 5/222* (2006.01)
(52) U.S. Cl. ................................. 348/333.02
(58) Field of Classification Search .............. 348/333.02
See application file for complete search history.

(56) References Cited

U.S. PATENT DOCUMENTS

| 7,525,697 | B2 * | 4/2009 | Suekane et al. ............. 358/1.15 |
| 2003/0169342 | A1 * | 9/2003 | Steinberg et al. .......... 348/207.1 |
| 2005/0197103 | A1 * | 9/2005 | Inoue ........................... 455/411 |

FOREIGN PATENT DOCUMENTS

JP 06-103239 4/1994

* cited by examiner

*Primary Examiner* — Anthony J Daniels
(74) *Attorney, Agent, or Firm* — Cowan, Liebowitz & Latman, P.C.

(57) ABSTRACT

An image capturing apparatus for capturing the image of a subject includes: a lock/unlock unit adapted to lock and unlock operation of the image capturing apparatus; a registration unit adapted to register a main item and a sub-item that have been selected by a user, wherein the main item is a main setting item among operation items of the image capturing apparatus and the sub-item is a setting item in a layer lower than that of the main item; and a control unit adapted to limit operation solely to a release operation of the image capturing apparatus and to the main item and sub-item, which have been registered by the registration unit, in a case where operation of the image capturing apparatus has been locked by the lock/unlock unit.

6 Claims, 20 Drawing Sheets

FIG. 9

| METERING MODE SETTING |
|---|
| ☐ EVALUATION METERING |
| ☑ PARTIAL METERING |
| ☑ SPOT METERING |
| ☐ CENTERWEIGHTED AVERAGING METERING |
| APPLY  RETURN (Menu) |

F I G. 17
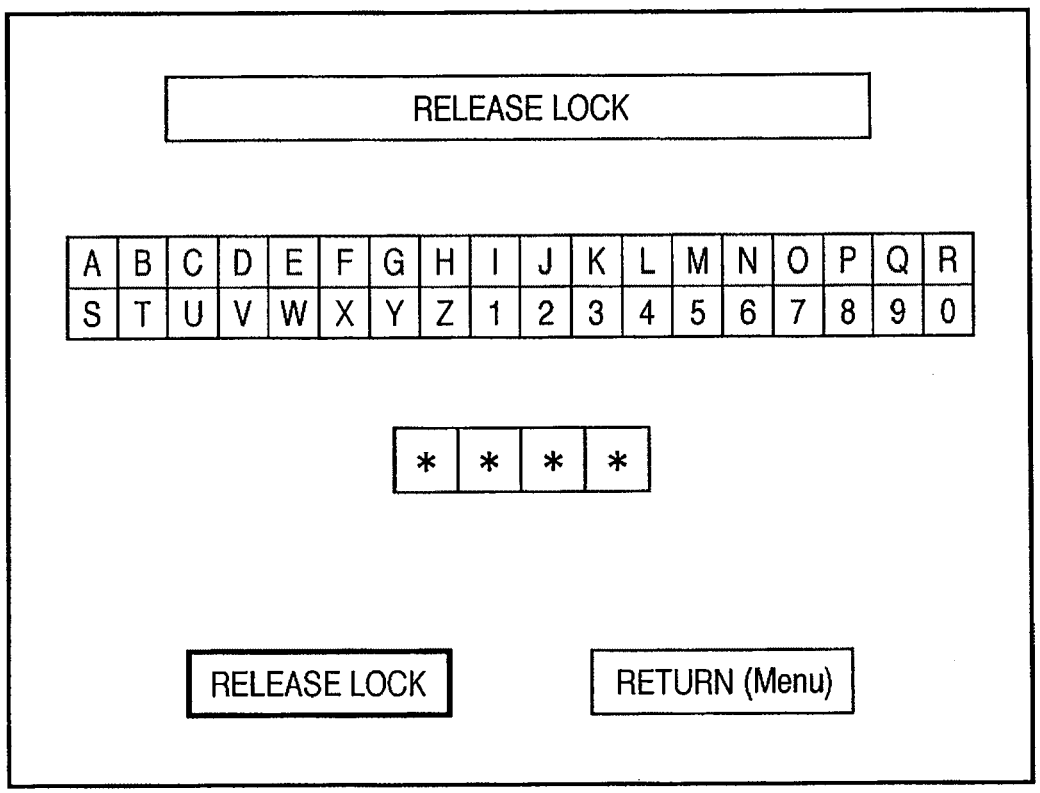

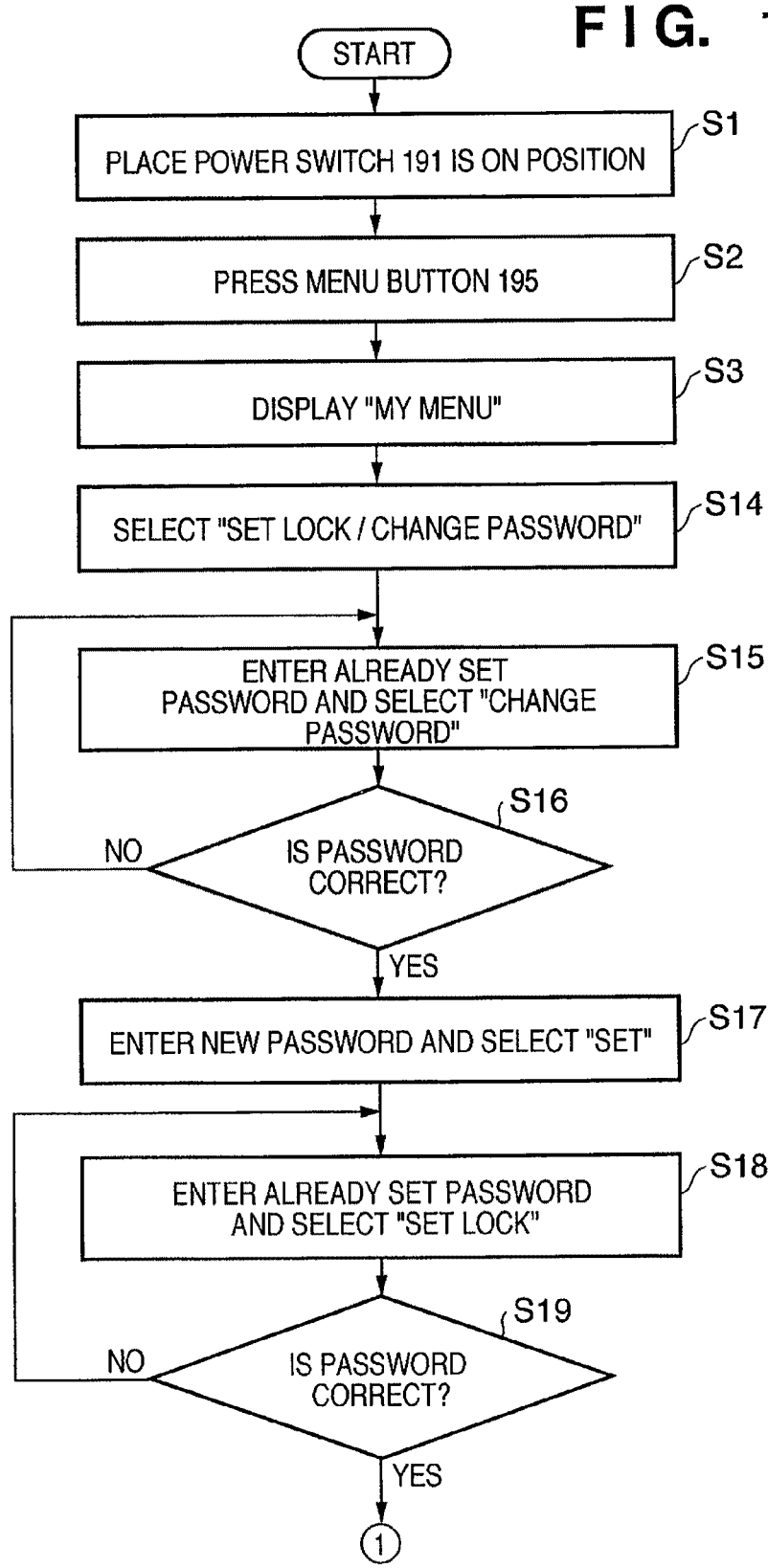

IMAGE CAPTURING APPARATUS, METHOD OF CONTROLLING SAME AND PROGRAM THEREFOR

BACKGROUND OF THE INVENTION

1. Field of the Invention

The present invention relates to a technique in an image capturing apparatus such as a digital camera that makes it possible to operate an item desired by a user even in a case where the image capturing apparatus is locked against operation.

2. Description of the Related Art

Digital cameras have become widespread in recent years and now are being used also in photo studios that have been employing conventional silver-halide cameras. In a photo studio, often a picture is taken in an environment in which the brightness of illumination and the white balance are fixed, and often a picture is taken with exposure fixed as well. For this reason, often the camera is set so as to lock items for which a change is unnecessary, such as the aperture and shutter speed, and to make possible only a minimum necessary operation, such as operation of shutter speed.

Further, in accordance with the specification of Japanese Patent Laid-Open No. 6-103239, a portable computer in which the environment in which a system is used is changed in response to a match with a password is disclosed.

However, there are cases where a function that the photographer wishes to render operable differs depending upon the circumstances at the particular photo studio. Conventionally, if camera settings are locked, only functions decided in advance are operable and these cannot be changed. That is, inconveniences can arise, such as a case where a function that the photographer wishes to lock cannot be locked, or, conversely, a case where a function that the photographer desires to operate has been locked.

SUMMARY OF THE INVENTION

Accordingly, the present invention has been devised in view of the above-described circumstances and seeks to make it possible to operate a camera function desired by a user even in a case where the camera is locked against operation.

According to a first aspect of the present invention, the foregoing object is attained by providing an image capturing apparatus for capturing the image of a subject, comprising: a lock/unlock unit adapted to lock and unlock operation of the image capturing apparatus; a registration unit adapted to register a main item and a sub-item that have been selected by a user, wherein the main item is a main setting item among operation items of the image capturing apparatus and the sub-item is a setting item in a layer lower than that of the main item; and a control unit adapted to limit operation solely to a release operation of the image capturing apparatus and to the main item and sub-item, which have been registered by the registration unit, in a case where operation of the image capturing apparatus has been locked by the lock/unlock unit.

According to a second aspect of the present invention, the foregoing object is attained by providing a method of controlling an image capturing apparatus for capturing the image of a subject, comprising: a lock/unlock step of locking and unlocking operation of the image capturing apparatus; a registration step of registering a main item and a sub-item that have been selected by a user, wherein the main item is a main setting item among operation items of the image capturing apparatus and the sub-item is a setting item in a layer lower than that of the main item; and a control step of limiting operation solely to a release operation of the image capturing apparatus and to the main item and sub-item, which have been registered at the registration step, in a case where operation of the image capturing apparatus has been locked at the lock/unlock step.

Further features of the present invention will become apparent from the following description of exemplary embodiments with reference to the attached drawings.

BRIEF DESCRIPTION OF THE DRAWINGS

FIG. 9 is a diagram illustrating a menu screen displayed during operation of the digital camera according to this embodiment;

FIG. 17 is a diagram illustrating a menu screen displayed during operation of the digital camera according to this embodiment;

FIGS. 19A and 19B are flowcharts illustrating operation for locking and unlocking operation of the digital camera according to this embodiment.

DESCRIPTION OF THE EMBODIMENT

A preferred embodiment of the present invention will now be described in detail with reference to the accompanying drawings.

An overview of this embodiment will be described first.

In the digital camera of this embodiment, a user is capable of changing and setting various parameters (setting items) relating to photographic use of the camera using a cross key placed on the back of the digital camera and a menu screen displayed on a display unit on the back of the camera. These setting items include a metering mode setting, a bracketing setting, a shooting mode setting, an ISO sensitivity setting, a shutter speed setting, an aperture setting, a white balance setting, an image size setting and a picture style setting, etc.

Examples of the metering mode that can be set include averaging metering, centerweighted metering, center-weighted averaging metering, spot metering, and evaluation metering for dividing a screen into a plurality of areas, measuring the brightness of each divisional area and deciding exposure by evaluating the brightness of each divisional area. Examples of a bracketing setting item are an item for setting how many images will be shot by a single depression of the shutter-release button and an item for setting to what extent exposure or white balance is changed for every image. A single-shooting mode and a continuous-shooting mode are examples of shooting modes that can be set. ISO sensitivities that can be set are ISO 100 to ISO 3200, by way of example. Shutter speeds that can be set are, e.g., 30 sec to ⅛₀₀₀ sec. Settable aperture values are, e.g., F2.8 to F32. Further, sunlight, fluorescent lamp, electric bulb and cloudy weather, etc., can be set for white balance. Examples of settable image sizes are 6,000,000 and 3,000,000 pixels, etc., in the case of a camera that uses 10,000,000-pixel image sensor. Further, "picture style" refers to a function whereby the sharpness or color balance of shot image data can be changed according to user preference.

In this embodiment, it is possible for these setting items to be locked against change depending upon the volition of the user. In this case, the user selects items that are not desired to be locked from among these setting items and sets them as items not locked, thereby making it possible to change the settings only of the items that have been selected by the user, even in a case where operation of the digital camera has been placed in the locked state.

As a result, it is possible for the user to change only items desired to be changed, and only items for which a change in setting is not desired can be placed in the locked state by the user. This has the effect of enhancing user convenience.

This embodiment will now be described in detail.

Figure 1:
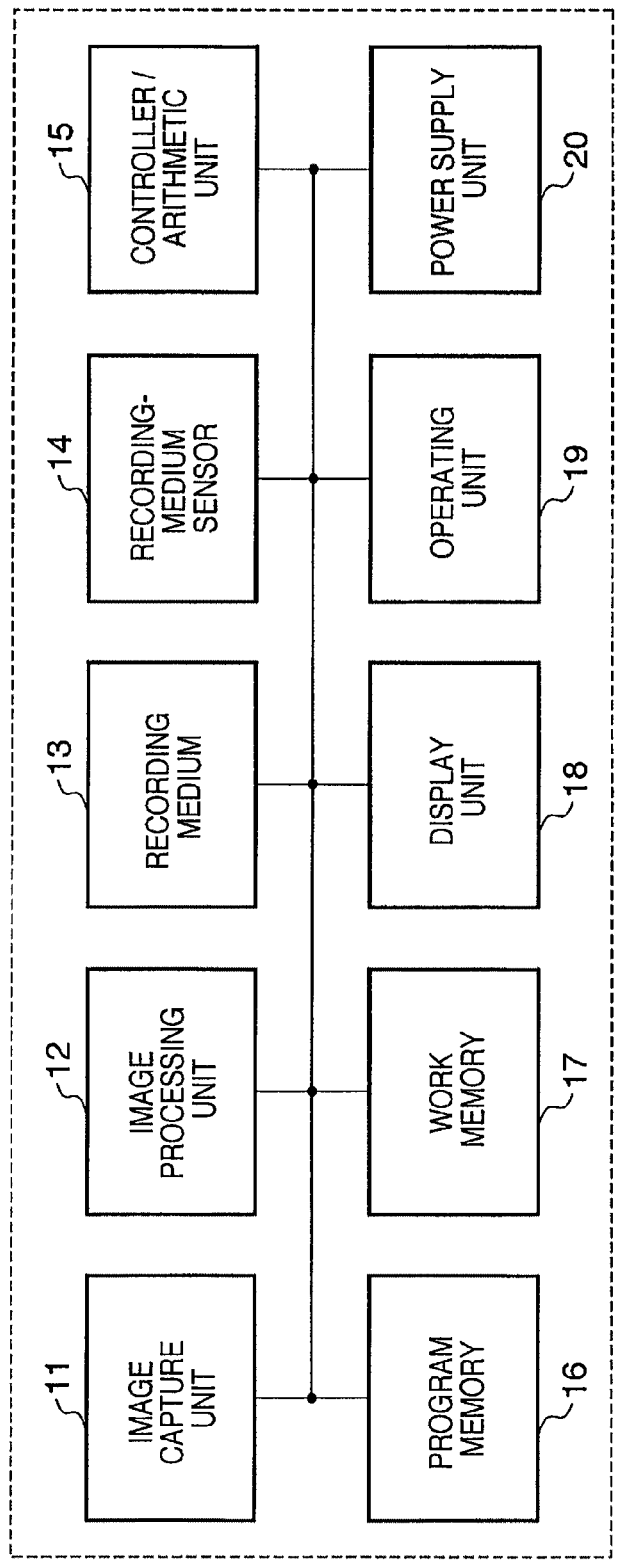
FIG. 1 is a block diagram of a portion of a digital camera that governs the processing of image data in an embodiment of the present invention.

FIG. 1 is a block diagram of a portion of the digital camera that governs the processing of image data in this embodiment of the present invention.

The blocks in FIG. 1 are structural elements classified function by function. First, an image capture unit 11 includes an image sensor such as a CCD or CMOS sensor. An image processing unit 12 applies prescribed image processing to the image captured by the image capture unit 11 and converts this image to a JPEG image or RAW image. A recording medium 13 records the image data that has been image-processed by the image processing unit 12 and comprises a removable image recording medium such as a memory card. A recording-medium sensor 14 senses that a new recording medium has been inserted. A controller/arithmetic unit 15 has a program-workspace memory and a microcomputer. A program executed by the controller/arithmetic unit 15 has been written to a program memory 16, which usually is constituted by a ROM. A work memory 17 is used as a workspace memory for the controller/arithmetic unit 15, as a workspace memory employed when a shot image is subjected to image processing, and as an image buffer memory for storing image data temporarily. It is usually constituted by a RAM. A display unit 18 displays shot images and images that have been recorded on a recording medium. The display unit 18 is also used as a menu screen for making various settings using an operating unit 19. The latter allows the operator to set image processing and to designate shooting. A power supply unit 20 supplies power to the overall digital camera.

Figure 2:
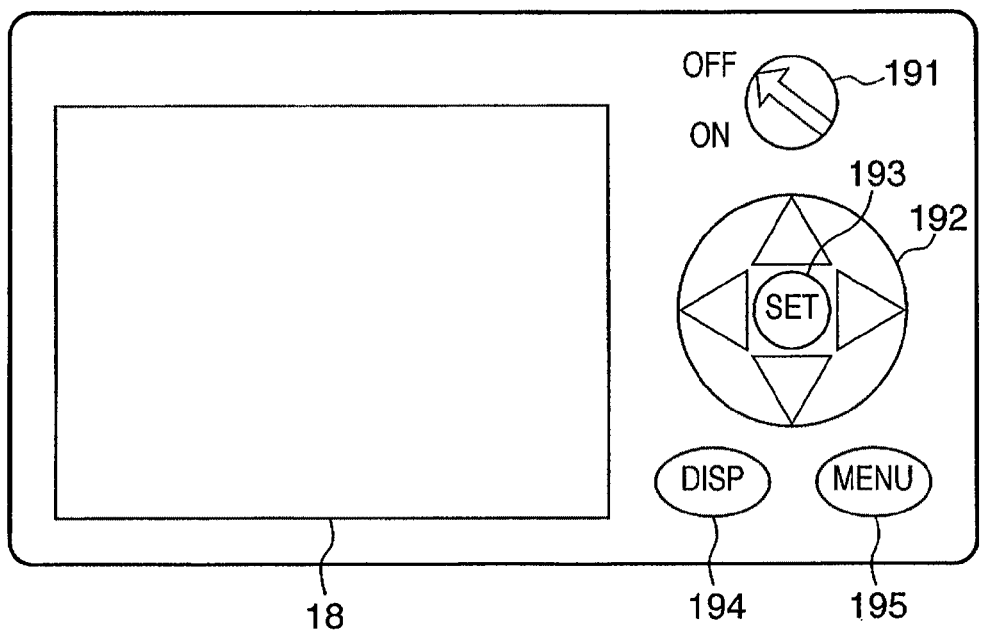
FIG. 2 is a diagram of the digital camera of this embodiment as seen from the back thereof and illustrates an operating unit and display unit placed on the back panel of the digital camera.

FIG. 2 is a diagram of the digital camera of this embodiment as seen from the back thereof and illustrates the operating unit and display unit placed on the back panel of the digital camera.

The display unit 18 shown in FIG. 1 is illustrated in FIG. 2. Operating members 191 to 195 constitute the operating unit 19 of FIG. 1. Specifically, member 191 is a power switch. When the power switch 191 is in the OFF position, supply of power from the power supply unit 20 to the digital camera is stopped and the digital camera is placed in the power OFF state. When the power switch 191 is in the ON position, power is supplied from the power supply unit 20 to the digital camera and the digital camera is placed in the power ON state. Member 192 is a cross key. The cross key 192 can be used to select a memory item or to select a reproduced image in response to pressing of any of up, down, left and right keys. The member 193 is a decide key, which is used when an item that has been selected in a menu by the cross key 192 is finalized. The member 194 is a playback button, which is used when an image is reproduced and displayed on the display unit 18. The member 195 is a menu button, which is used when a menu is to be displayed.

Next, reference will be had to the back-panel diagram, menu screen diagrams and flowcharts of FIGS. 2 to 19B to describe operation for placing the setting items of various shooting parameters in this embodiment in the locked state or unlock state.

Described first will a method of selecting a main setting item and a method of selecting a subordinate setting item in a layer lower than that of the main setting item when operation of the camera is in the unlocked state. The main item and sub-item are shooting parameters that are not locked in this state.

Figure 18:
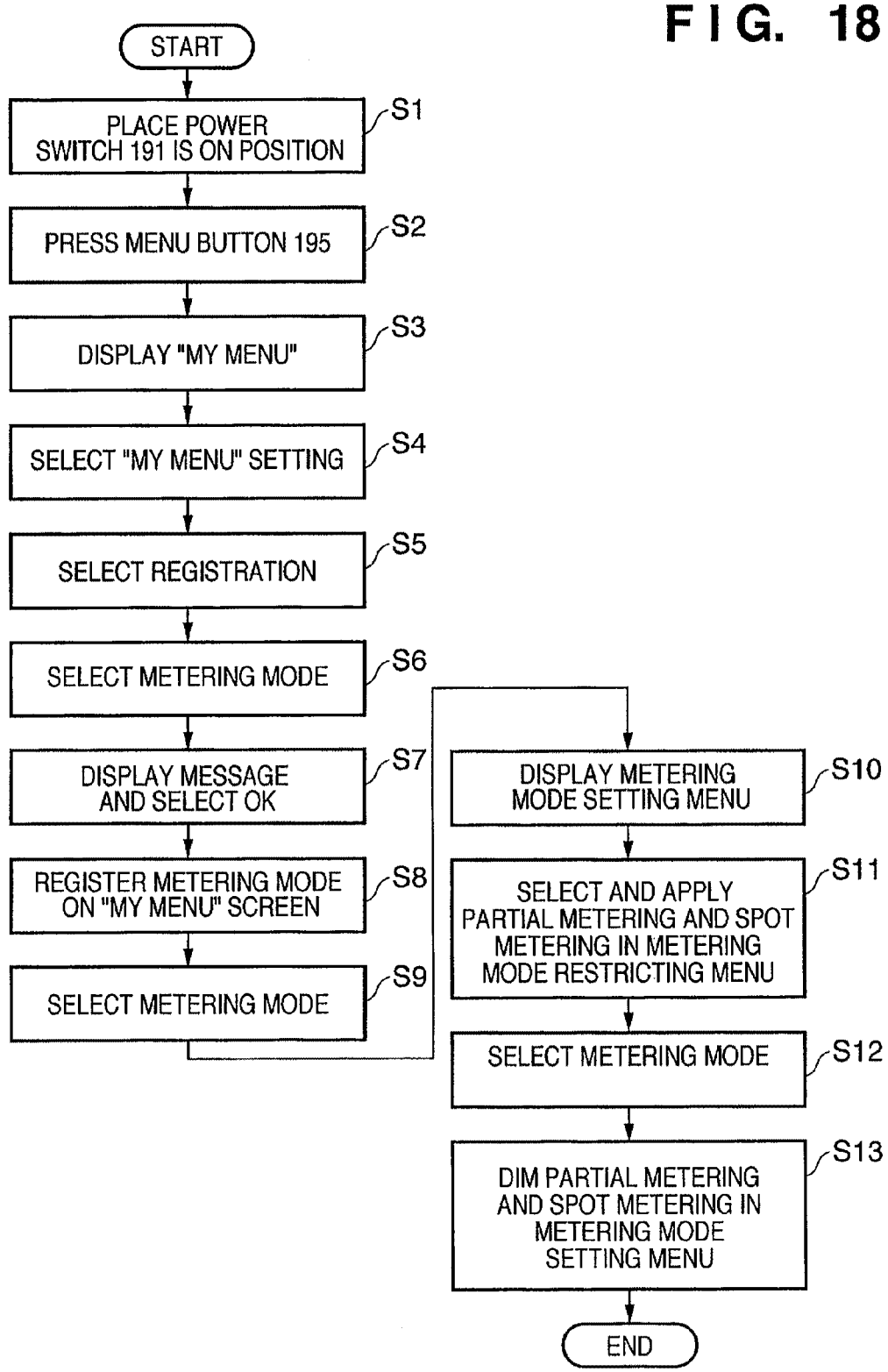
FIG. 18 is a flowchart illustrating an operation for setting the digital camera according to this embodiment.

First, at step S1 in FIG. 18, the camera is placed in the power ON state when the power switch 191 is operated by the user.

Figure 3:
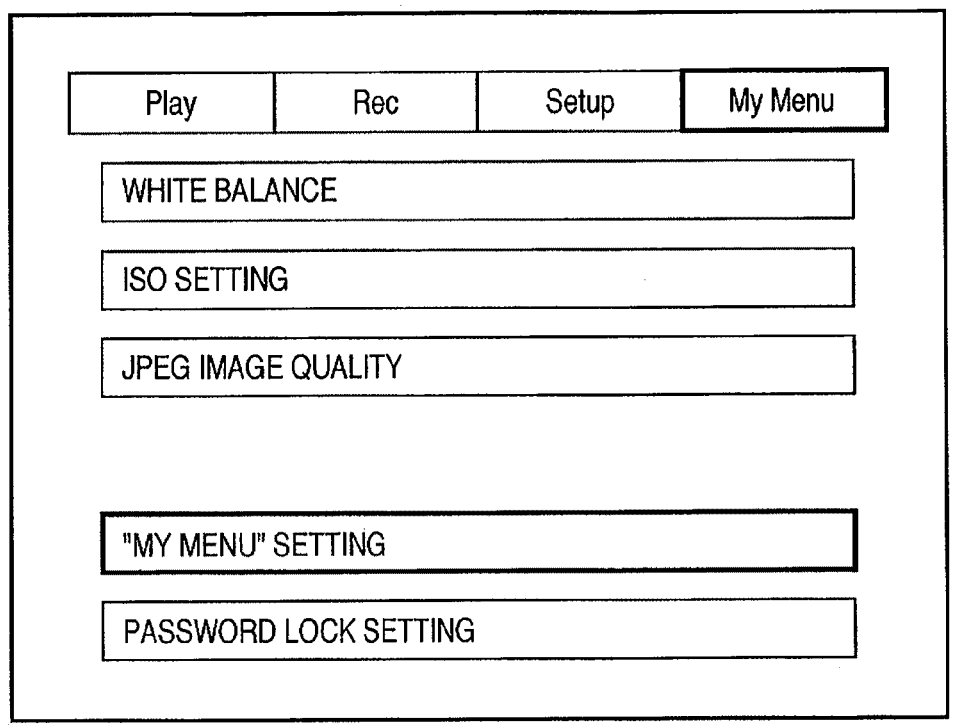
FIG. 3 is a diagram illustrating a menu screen displayed during operation of the digital camera according to this embodiment.

When the menu button 195 is pressed by the user at step S2, the controller/arithmetic unit 15 displays the menu of FIG. 3 on the image sensor package 3. The menu depicted in FIG. 3 is a menu that displays setting items for which a selection not to lock has been made by the user. This menu shall be referred to as "MY MENU". The two items at the bottom are items necessary for setting of "MY MENU", and the three menu items in the upper section are menu items that have already been registered in "MY MENU" as setting items not to be locked.

If the user wishes to increase or decrease the number of setting items that are not to be locked, then "MY SETTING MENU" is selected by the cross key 192 at step S4. When this is done, the controller/arithmetic unit 15 displays the selected menu item in a bold item border so that selection can be discerned. If the user decides entry by pressing the decide key 193, the controller/arithmetic unit 15 displays the menu of FIG. 4 on the display unit 18.

Figure 4:
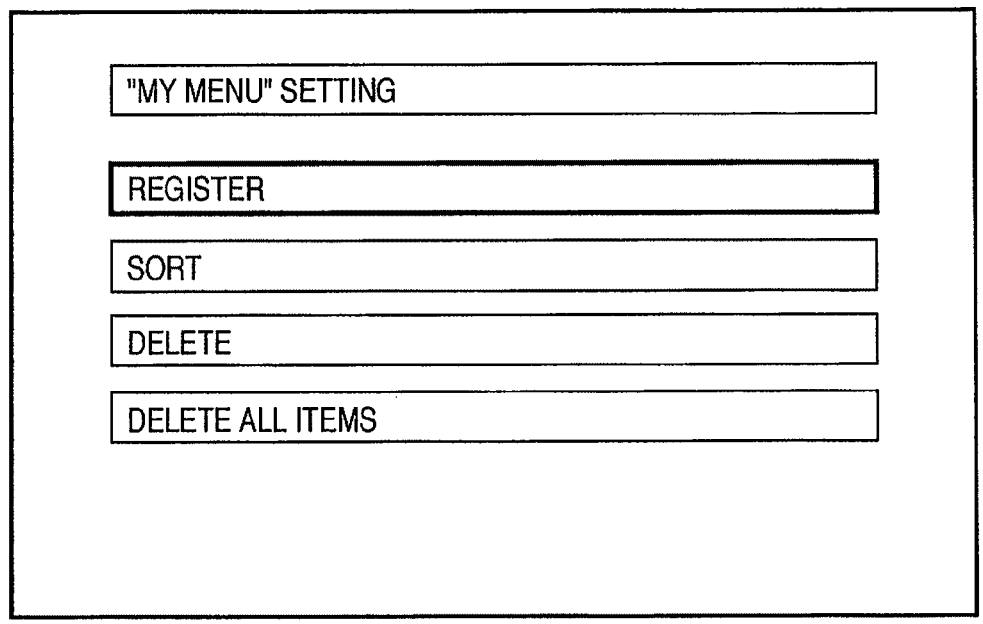
FIG. 4 is a diagram illustrating a menu screen displayed during operation of the digital camera according to this embodiment.

While observing the menu illustrated in FIG. 4, the user selects "REGISTER" using the cross key 192 and finalizes this using the decide key 193 at step S5. When this is done, the controller/arithmetic unit 15 displays a registration item menu of the kind illustrated in FIG. 5 on the display unit 18.

Figure 5:
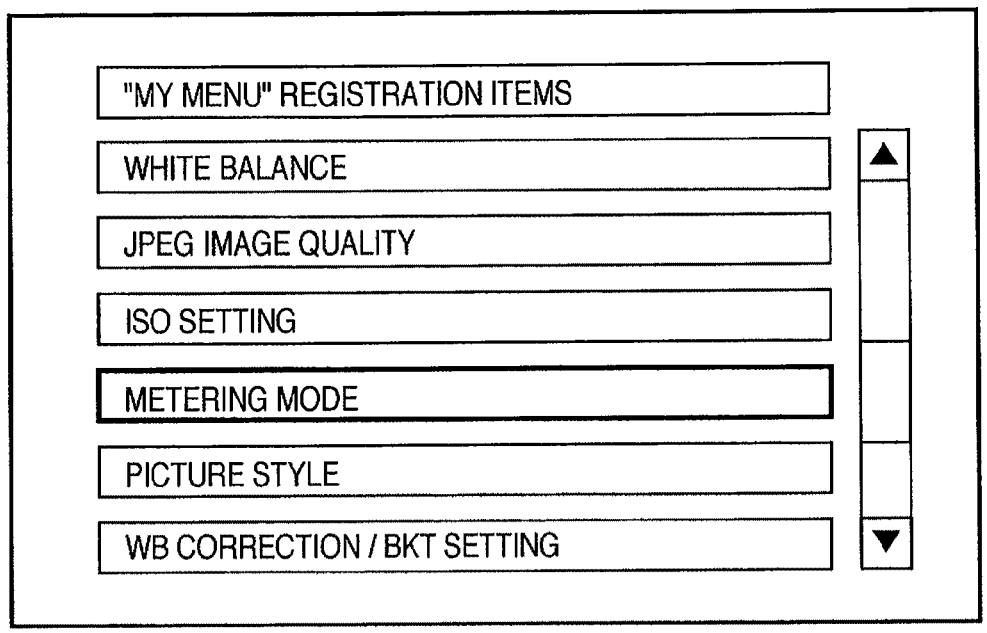
FIG. 5 is a diagram illustrating a menu screen displayed during operation of the digital camera according to this embodiment.

While observing the registration item menu illustrated in FIG. 5, the user selects, e.g., "METERING MODE" by the cross key 192 and finalizes this using the decide key 193 at step S6. When this is done, the controller/arithmetic unit 15 displays a message of the kind shown in FIG. 6 on the display unit 18.

Figure 6:
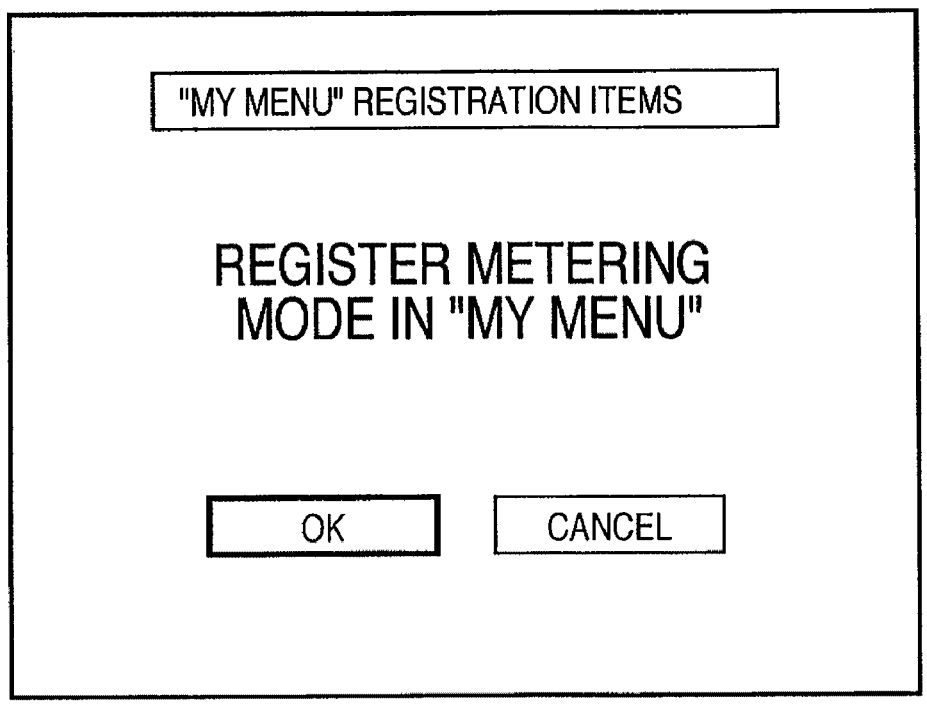
FIG. 6 is a diagram illustrating a menu screen displayed during operation of the digital camera according to this embodiment.

While observing the message illustrated in FIG. 6, the user selects "OK" by the cross key 192 and finalizes this using the decide key 193 at step S7.

Figure 7:
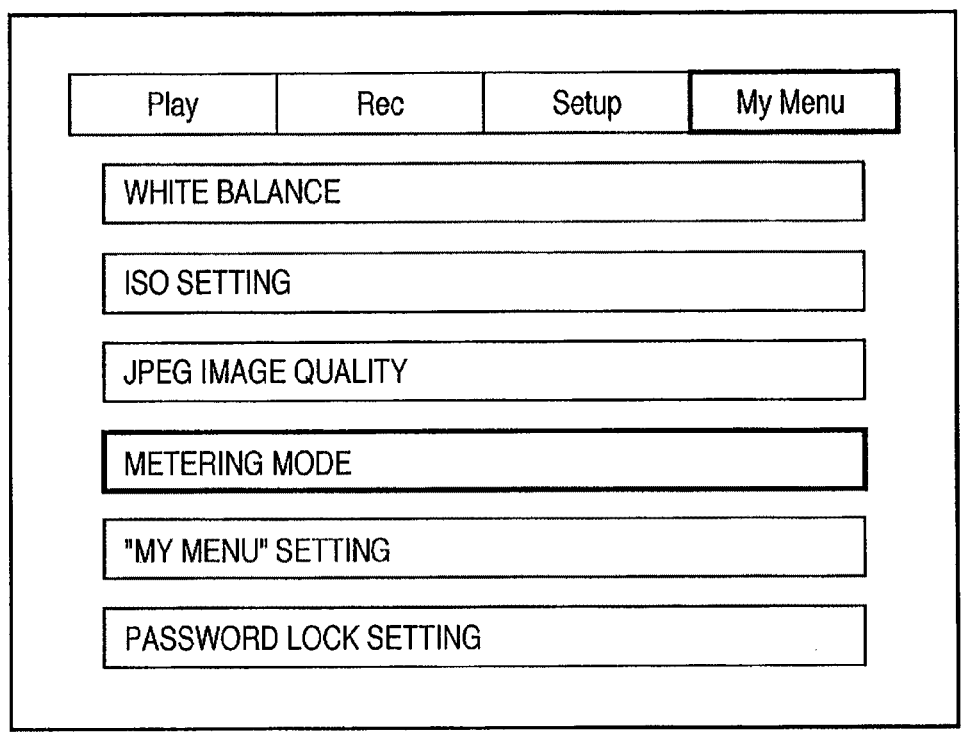
FIG. 7 is a diagram illustrating a menu screen displayed during operation of the digital camera according to this embodiment.

In response to this operation, the controller/arithmetic unit 15 registers the metering mode on the "MY MENU" screen at step S8 (see FIG. 7). As a result, even if the camera has been placed in a state locked against operation, the "METERING MODE" setting can be rendered changeable.

Although a case where a setting is made so as not to lock the "METERING MODE" has been described, an item set so as not to be locked can be selected freely by the user depending upon the wishes of the user from the registration menu items illustrated in FIG. 5. Further, by repeating the same operation, it is possible to set a plurality of items so as not to be locked.

When registration is performed at step S8, a transition is made to the menu illustrated in FIG. 7.

While observing the menu illustrated in FIG. 7, the user selects "METERING MODE" again by the cross key 192 and finalizes this using the decide key 193 at step S9.

Figure 8:
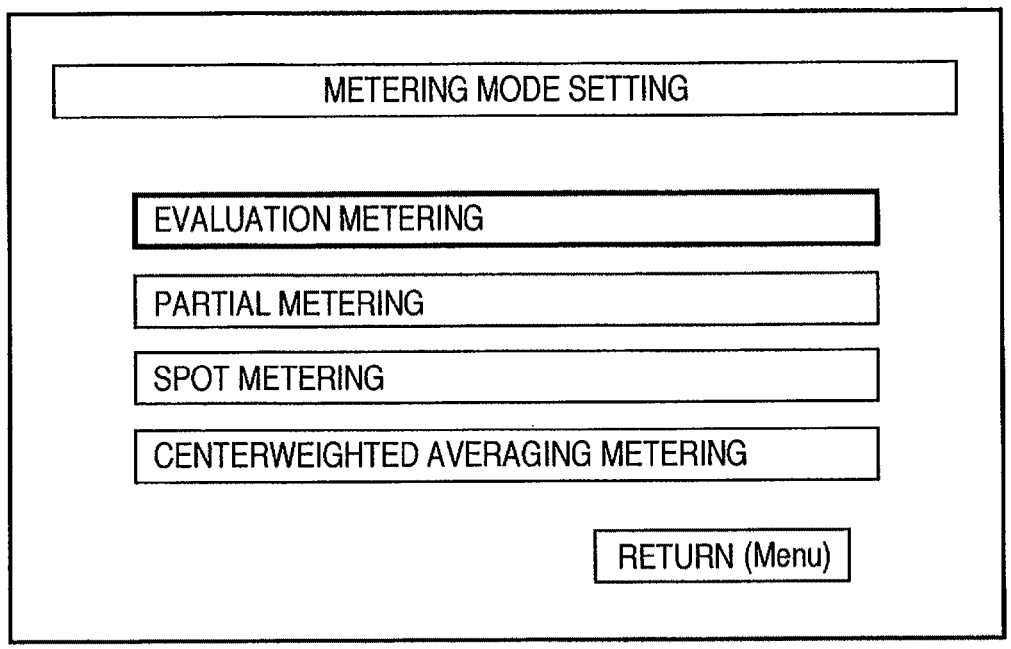
FIG. 8 is a diagram illustrating a menu screen displayed during operation of the digital camera according to this embodiment.

In response to this operation, the controller/arithmetic unit 15 displays a metering mode setting menu, which is shown in FIG. 8, on the display unit 18 at step S10. In FIG. 8, all metering modes are selectable.

At step S11, if the user selects the menu item "METERING MODE RESTRICTION", the controller/arithmetic unit 15 displays a metering mode restricting menu, which is shown in FIG. 9, on the display unit 18. Using the cross key 192 and decide key 193, the user places a check mark at the side of menu items (e.g., "PARTIAL METERING" and "SPOT METERING"), which the user wishes to make non-selectable, in the metering mode restricting menu of FIG. 9. The user then selects "APPLY" and finalizes this. As a result, even in a case where the camera has been placed in a state in which it is locked against operation, the setting of "METERING MODE" is changeable but selection items are restricted in such a manner that partial metering and spot metering cannot be selected as metering modes.

Although partial metering and spot metering have been set here so as not to be selectable, it is possible for the user to freely select items desired to be rendered non-selectable from the metering mode restricting menu illustrated in FIG. 9. Further, a plurality of items can be made non-selectable.

While observing the menu illustrated in FIG. 7, the user selects "METERING MODE" again by the cross key 192 and finalizes this using the decide key 193 at step S12.

Figure 10:
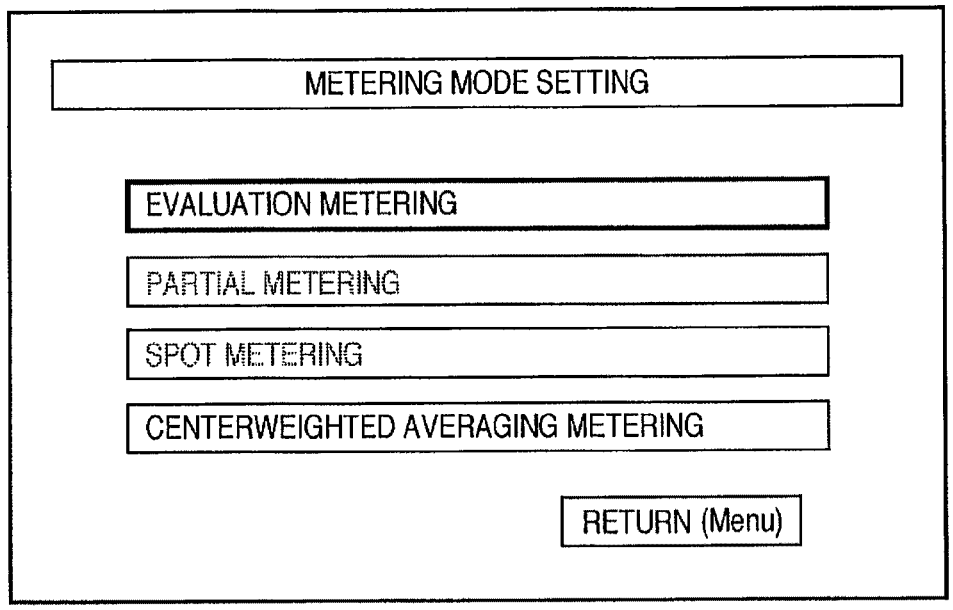
FIG. 10 is a diagram illustrating a menu screen displayed during operation of the digital camera according to this embodiment.

In response to this operation, the controller/arithmetic unit 15 displays a metering mode setting menu, which is shown in FIG. 10, on the display unit 18 at step S10. In the case of this example, partial metering and spot metering are dimmed to render them non-selectable. As a result, even in a case where the camera has been placed in a state in which it is locked against operation, partial metering and spot metering can no longer be selected.

Figure 19B:
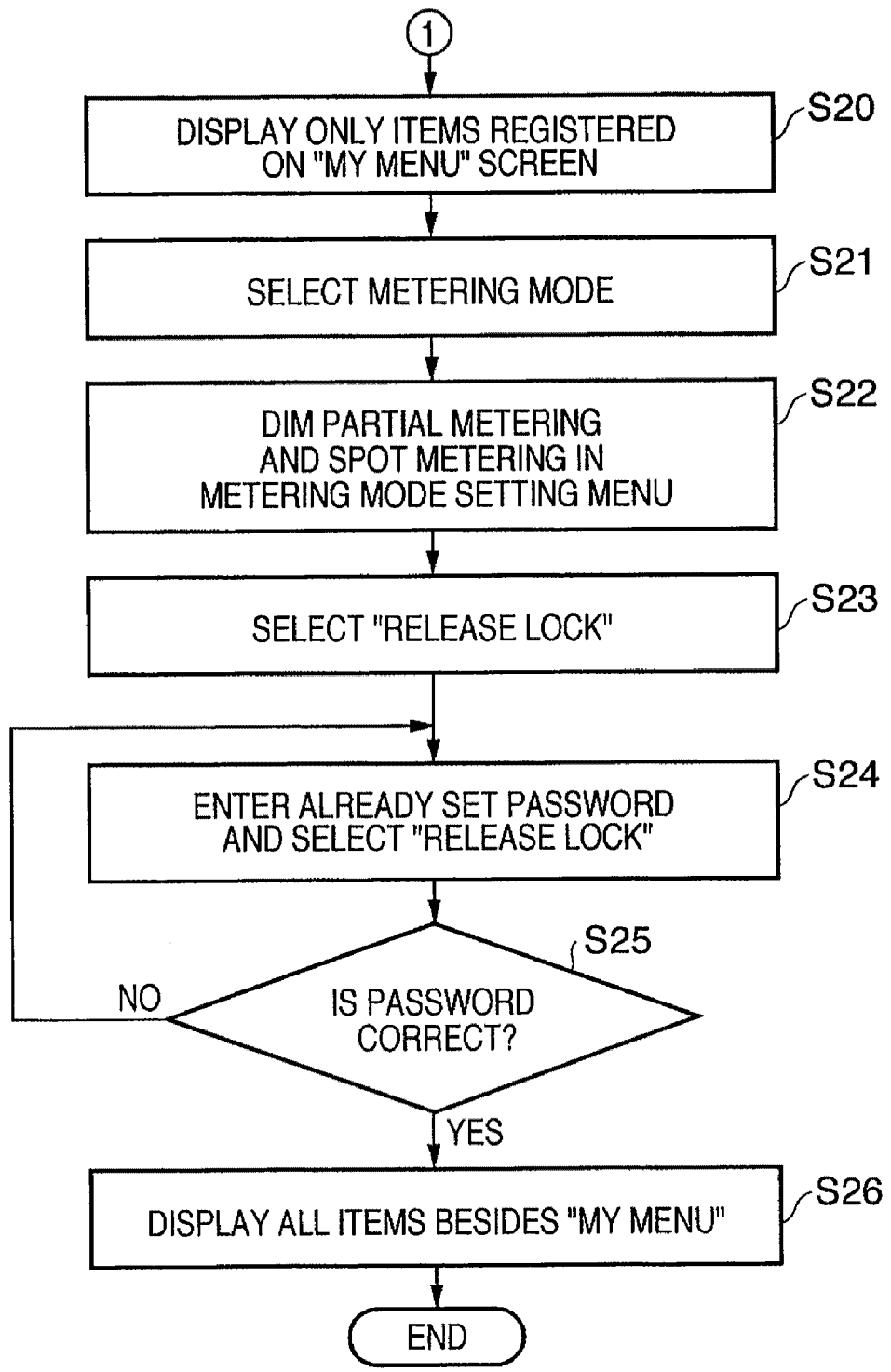

Next, reference will be had to the back-panel diagram of FIG. 2, menu screen diagrams of FIGS. 11 to 17 and the flowchart of FIGS. 19A and 19B to describe a method of switching between the unlocked and locked states and a change of password.

Steps S1 to S3 in FIG. 19A are similar to those in the flowchart of FIG. 18 and need not be described again.

Figure 11:
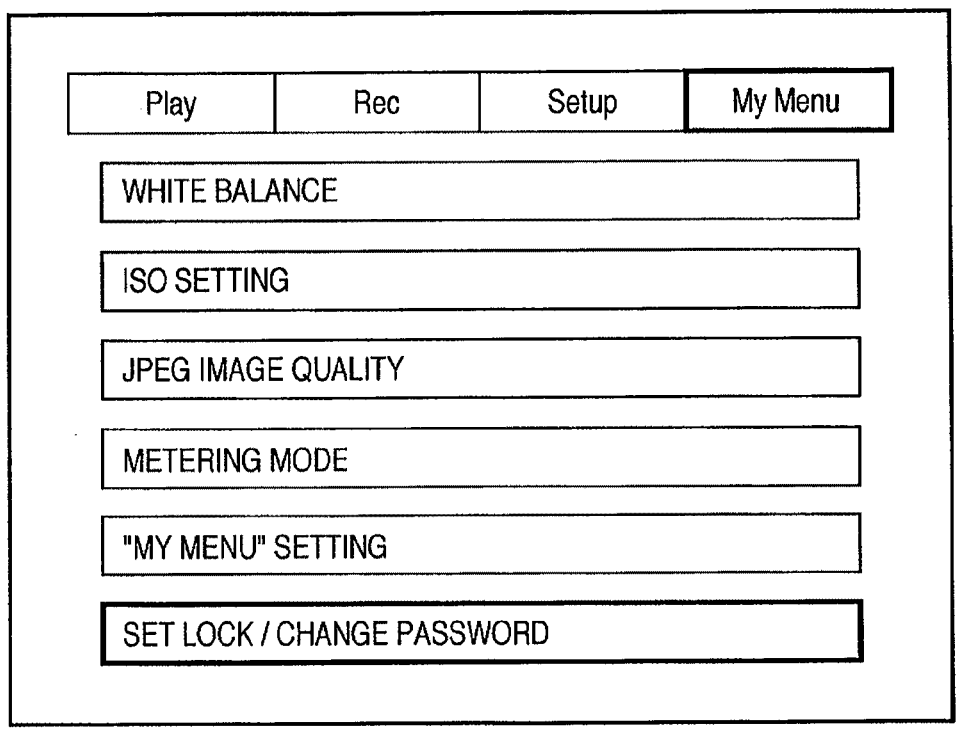
FIG. 11 is a diagram illustrating a menu screen displayed during operation of the digital camera according to this embodiment.

If the user wishes to change over the locked state of the camera or wishes to change the password, then the user selects "SET LOCK/CHANGE PASSWORD" from the menu of FIG. 11 by the cross key 192 and finalizes this by the decide key 193 at step S14. When this is done, the controller/arithmetic unit 15 displays the menu of FIG. 12 on the display unit 18.

Figure 12:
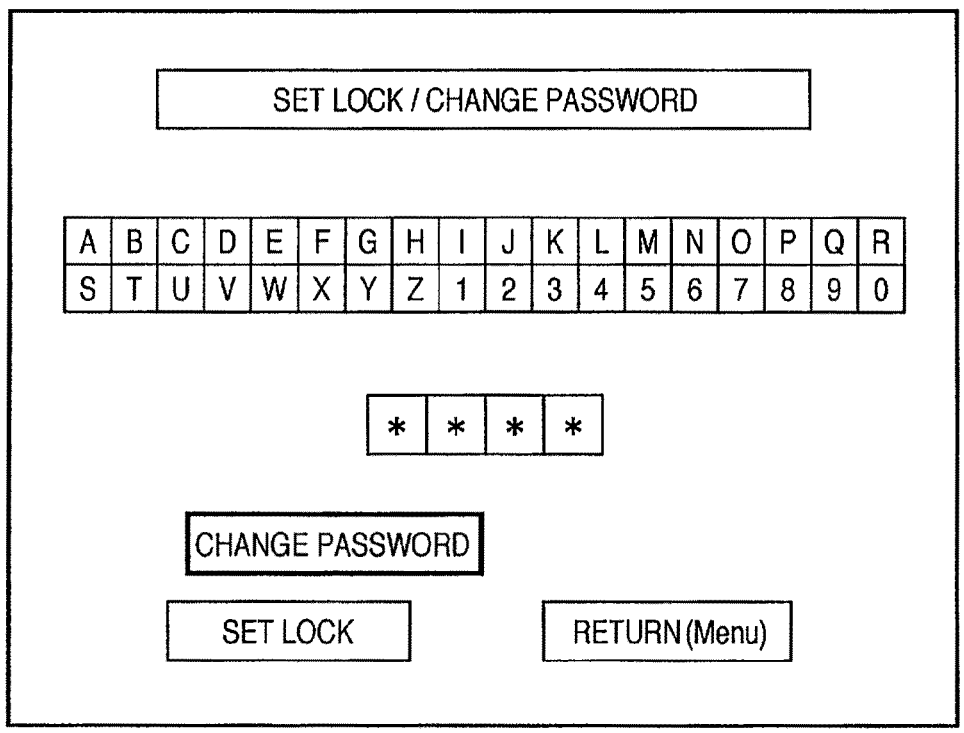
FIG. 12 is a diagram illustrating a menu screen displayed during operation of the digital camera according to this embodiment.

While observing the menu illustrated in FIG. 12 and using the cross key 192 and decide key 193, the user enters an already set password, selects "CHANGE PASSWORD" and finalizes this at step S15.

At step S16, the controller/arithmetic unit 15 determines whether the entered password is correct or not. Control proceeds to step S17 if the entered password is correct and returns to step S15 if the entered password is not correct.

Figure 13:
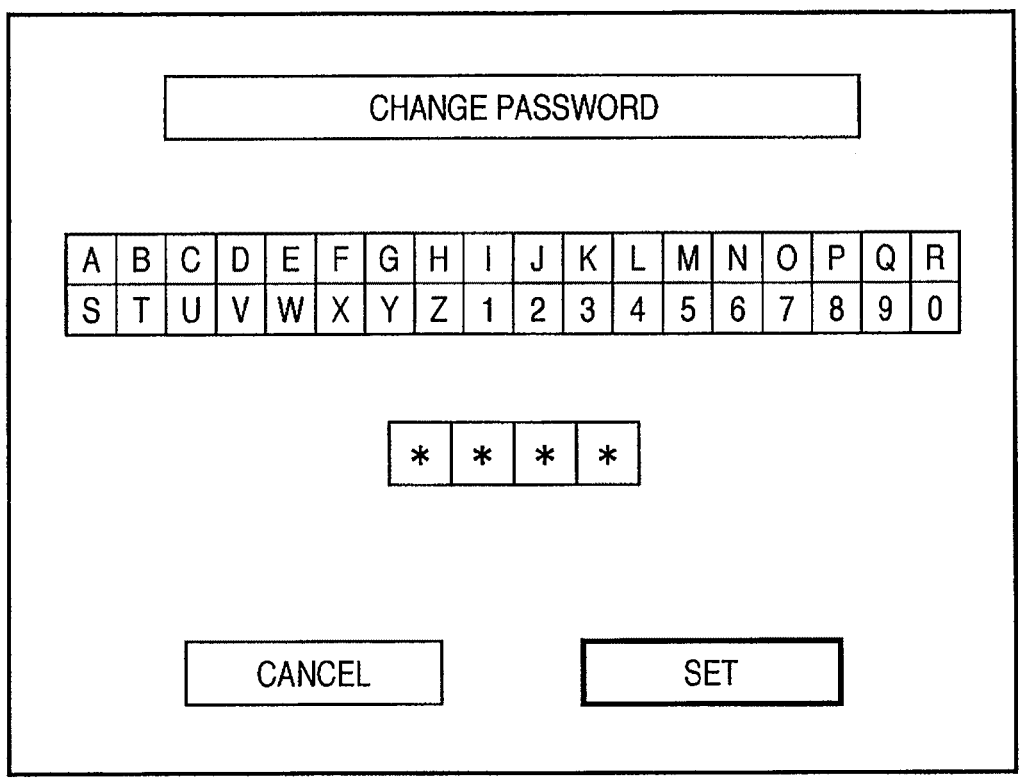
FIG. 13 is a diagram illustrating a menu screen displayed during operation of the digital camera according to this embodiment.

The controller/arithmetic unit 15 displays a menu shown in FIG. 13 on the display unit 18 at step S17. While observing the menu illustrated in FIG. 13 and using the cross key 192 and decide key 193, the user enters a new password, selects "SET" and finalizes this. When this is done, the controller/arithmetic unit 15 changes the password to the new password and the menu returns to the menu shown in FIG. 14.

Figure 14:
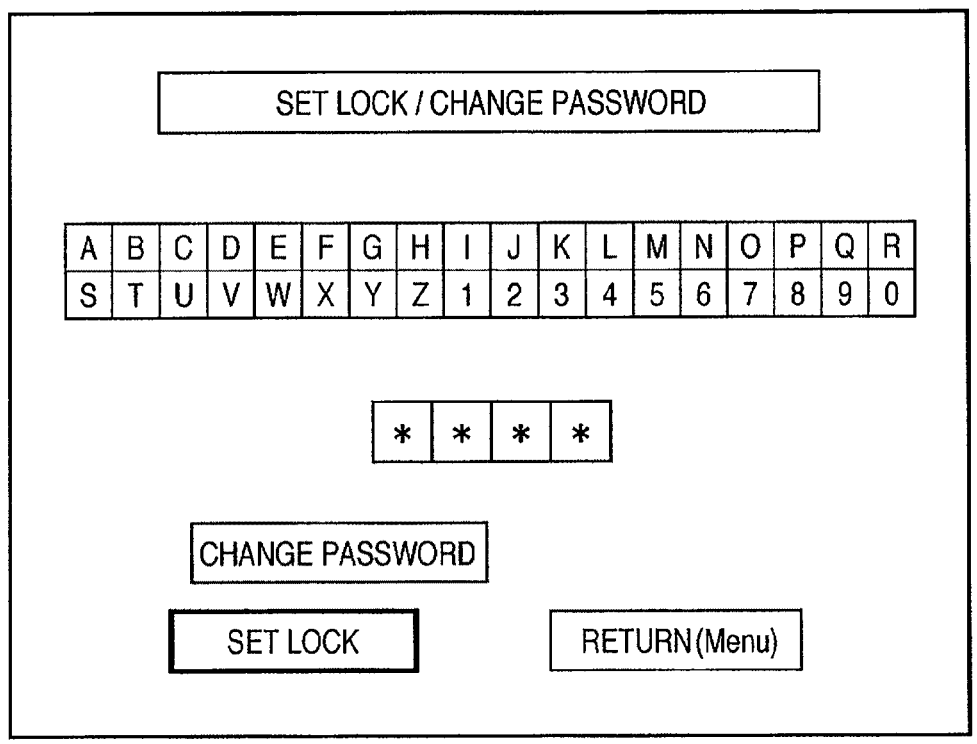
FIG. 14 is a diagram illustrating a menu screen displayed during operation of the digital camera according to this embodiment.

If the user wishes to place the camera in the locked state, then, using the cross key 192 and decide key 193, the user enters the already set password, selects "SET LOCK" and finalizes this at step S18 on the menu shown in FIG. 14.

At step S19, the controller/arithmetic unit 15 determines whether the entered password is correct or not. Control proceeds to step S20 if the entered password is correct and returns to step S18 if the entered password is not correct.

Figure 15:
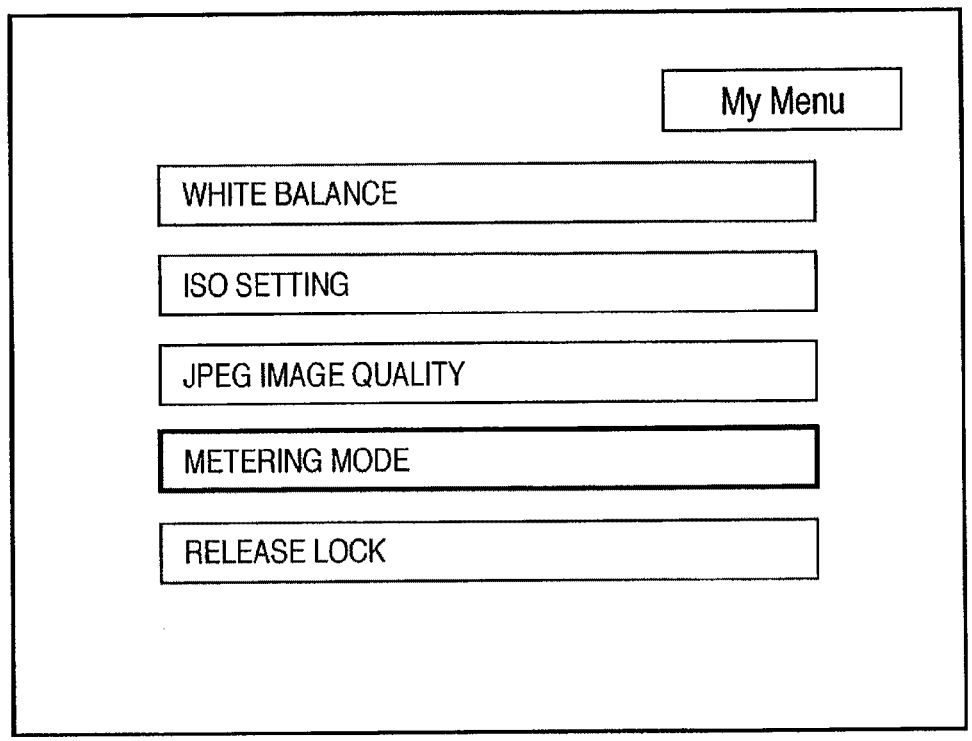
FIG. 15 is a diagram illustrating a menu screen displayed during operation of the digital camera according to this embodiment.

The controller/arithmetic unit 15 displays a menu shown in FIG. 15 on the display unit 18 at step S20. This screen displays only the items that have been registered in "MY MENU". That is, only a change of items registered in "MY MENU" and a release operation are possible; items that have not been registered in "MY MENU" are locked and cannot be changed.

While observing the menu shown in FIG. 7, the user selects "METERING MODE" by the cross key 192 and finalizes this by the decide key 193 at step S21.

Figure 16:
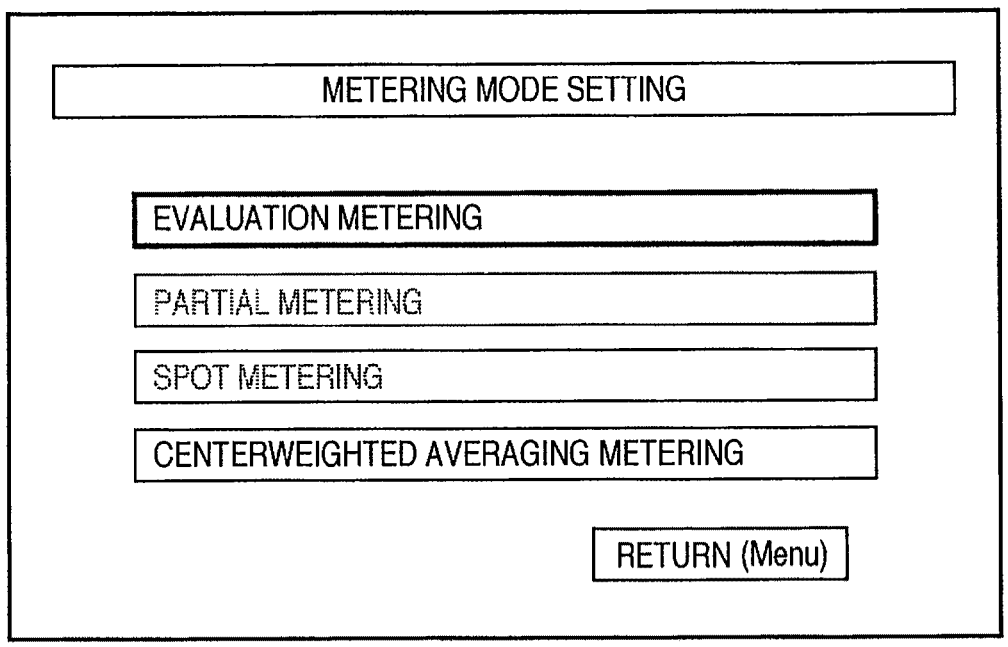
FIG. 16 is a diagram illustrating a menu screen displayed during operation of the digital camera according to this embodiment.

In response to this operation, the controller/arithmetic unit 15 displays a metering mode setting menu, which is shown in FIG. 16, on the display unit 18 at step S22. In this example, partial metering and spot metering are dimmed to render them non-selectable.

If the user wishes to release the camera from the locked state, then, while observing the menu shown in FIG. 15, the user selects "RELEASE LOCK" by the cross key 192 and finalizes this by the decide key 193. When this is done, the controller/arithmetic unit 15 displays the menu shown in FIG. 17 on the display unit 18.

While observing the menu shown in FIG. 17 and using the cross key 192 and decide key 193, the user enters the already set password, selects "RELEASE LOCK" and finalizes this.

At step S25, the controller/arithmetic unit 15 determines whether the entered password is correct or not. Control proceeds to step S26 if the entered password is correct and returns to step S24 if the entered password is not correct.

At step S26, the screen returns to the menu shown in FIG. 16, operation of the camera is placed in the unlocked state and all camera functions become capable of being used.

Thus, as described above, when the camera has been locked against operation, the user is capable of selecting a menu item desired to be operated. This has the effect of broadening the operation variations available when the camera has been locked against operation.

Further, since it is possible to select a main item and a sub-item in a layer lower than the main item, the range of setting of camera setting parameters can also be set, by way of example, and it becomes possible to adopt a method of use in which, depending upon the circumstances at a photo studio, the brightness parameter is allowed to be changed in limited fashion even if operation of the camera has been locked.

Other Embodiments

The object of the embodiment is attained also by the following method: Specifically, a storage medium (or recording medium) on which the program codes of the software for implementing the functions of the foregoing embodiment is supplied to a system or apparatus. A computer (CPU or MPU) of the system or apparatus reads out and executes the program codes stored on the storage medium. In this case, the program codes per se read from the storage medium implement the functions of the embodiment and the storage medium storing the program codes constitutes the invention. Further, by executing the program codes read out by the computer, not only are the functions of the embodiment implemented but the following is included in the present invention as well: Specifically, an operating system or the like running on the computer executes some or all of the actual processing based upon the indications in the program codes, and the functions of the above-described embodiment are implemented by this processing.

Furthermore, the following case also is included in the present invention. Specifically, program code read from storage medium is written to a memory provided on a function expansion card inserted into the computer or provided in a function expansion unit connected to the computer. Thereafter, a CPU or the like provided on the function expansion card or function expansion unit performs some or all of actual processing based upon the indication in the program codes, and the functions of the above embodiment are implemented by this processing.

In a case where the present invention is applied to the above-mentioned storage medium, program code corresponding to the procedures described earlier is stored on this storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-039827, filed Feb. 20, 2007, which is hereby incorporated by reference herein in its entirety.

What is claimed is:

1. An image capturing apparatus for capturing the image of a subject, comprising:
    a display unit adapted to display a menu screen which is for setting at least a function of the image capturing apparatus;
    a setting unit adapted to set a locked state in which operation of the image capturing apparatus is locked or set an unlocked state in which the operation of the image capturing apparatus is unlocked;
    a designation unit adapted to designate a main item and a sub-item as items that are operable in the locked state or a main item and a sub-item as items that are not operable in the locked state from a plurality of items which are selectable in the menu screen, wherein the sub-item is a setting item in a layer lower than that of the main item;
    a display control unit adapted to control said display unit to display the menu screen such that a user cannot select the items that are designated by said designation unit as items that are not operable in the locked state and that the user can select the items that are designated by said designation unit as items that are operable in the locked state, when the locked state is set by said setting unit; and
    a control unit adapted to control selection of the items in the menu screen controlled by said display control unit and execution of a release operation of the image capturing apparatus, when the locked state is set by said setting unit.

2. The apparatus according to claim 1, wherein the main item in the plurality of items includes at least one among a metering mode setting, a bracketing setting, a shooting mode setting, an ISO sensitivity setting, a shutter speed setting, an aperture setting, a white balance setting, an image size setting and a picture style setting.

3. The apparatus according to claim 1, further comprising:
    an input unit adapted to input a password to the image capturing apparatus; and
    a permission unit adapted to permit said setting unit to set the locked state or unlocked state in accordance with the password that has been input by said input unit.

4. The apparatus according to claim 3, wherein the password is changeable by the user in the unlocked state.

5. A method of controlling an image capturing apparatus for capturing the image of a subject, comprising:
    a display step of displaying a menu screen which is for setting at least a function of the image capturing apparatus on a display unit;
    a setting step of setting a locked state in which operation of the image capturing apparatus is locked or set an unlocked state in which the operation of the image capturing apparatus is unlocked;
    a designation step of designating a main item and a sub-item as items that are operable in the locked state or a main item and a sub-item as items that are not operable in the locked state from a plurality of items which are selectable in the menu screen, wherein the sub-item is a setting item in a layer lower than that of the main item;
    a display control step of controlling said display step to display the menu screen such that a user cannot select the items that are designated by said designation step as items that are not operable in the locked state and that the user can select the items that are designated by said designation step as items that are operable in the locked state, when the locked state is set by said setting step; and
    a control step of controlling selection of the items in the menu screen controlled by said display control step and execution of a release operation of the image capturing apparatus, when the locked state is set by said setting step.

6. A non-transitory storage medium for storing a program for causing a computer to execute the method of control set forth in claim 5.

* * * * *